United States Patent [19]

Tanuma et al.

[11] Patent Number: 4,808,985
[45] Date of Patent: Feb. 28, 1989

[54] CHARACTER PATTERN CONVERTING CIRCUIT

[75] Inventors: Jiro Tanuma; Tadashi Kasai, both of Tokyo, Japan

[73] Assignee: Oki Electric Industry Co., Ltd., Tokyo, Japan

[21] Appl. No.: 50,477

[22] Filed: May 18, 1987

[30] Foreign Application Priority Data

May 30, 1986 [JP] Japan ................. 61-123788

[51] Int. Cl.$^4$ .................................. C09G 1/06
[52] U.S. Cl. ......................... 340/727; 340/735; 340/750
[58] Field of Search ............... 340/727, 723, 724, 748, 340/750, 780, 799, 798, 745, 735, 749; 382/46; 400/124

[56] References Cited

U.S. PATENT DOCUMENTS 4,118,695 10/1978 Ogawa et al. ............ 340/749
4,312,045 1/1982 Jean et al. ............... 340/727
4,636,783 1/1987 Omachi ................... 382/46

FOREIGN PATENT DOCUMENTS 55-10647 1/1980 Japan.
57-136687 8/1982 Japan.

Primary Examiner—John W. Caldwell, Sr.
Assistant Examiner—Alvin Oberley
Attorney, Agent, or Firm—Wenderoth, Lind & Ponack

[57] ABSTRACT

A character pattern converting circuit is adapted to control a character pattern expressed in the form of a dot matrix and received from a character generator and to deliver the character pattern so converted, and includes a first switching circuit for switching the order of bits constituting the character pattern provided from the character generator; a matrix circuit having shift registers arranged in the form of a matrix, the shift registers being adapted to shift upon permitting the character pattern from the first switching circuit to be entered in succession in the row or column direction thereof and to be delivered in the row direction thereof, respective bits of the character pattern simultaneously or selectively in conformity with the mode of the concerning conversion; a second switching circuit for switching the order of the bits constituting the character pattern provided from the matrix circuit in conformity with the mode of the concerning conversion; and a matrix control part for controlling the writing of the character pattern into the matrix circuit via the first switching circuit and the reading of the character pattern from the matrix circuit via the second switching circuit.

3 Claims, 4 Drawing Sheets

FIG.4(a)
FIG.4(b)
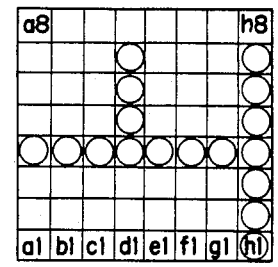
FIG.4(c)
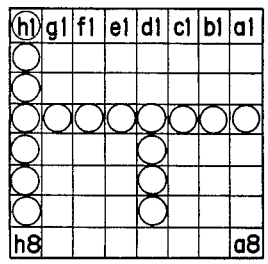
FIG.4(d)
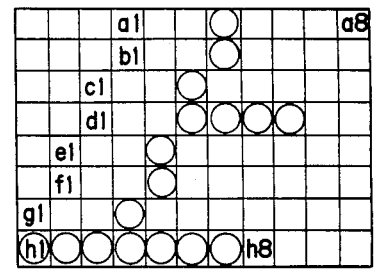
FIG.4(e)
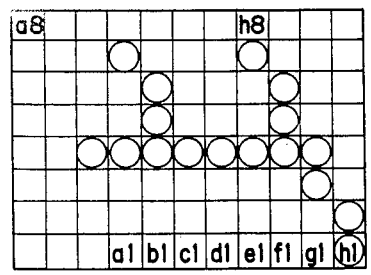

CHARACTER PATTERN CONVERTING CIRCUIT

BACKGROUND OF THE INVENTION

1. Field of the Invention

The present invention relates to a character pattern converting circuit for rendering a character pattern expressed in the form of a dot matrix to processings of vertical/lateral conversion and of inclination, and for delivering the converted pattern.

2. Description of the Prior Art

Conventionally, in printers for example, character patterns are stored in memories thereof fitted to the form of either vertical writing style or lateral writing style.

Accordingly, two types of character patterns are needed in printing for any of those writing styles. In addition, when any italic character is also printed, a memory is necessary for exclusive use of such italic characters. Thus, such a system is in need of large memory capacity and expensive.

Hereupon, a method is widely employed until now of storing only a character pattern of one kind and converting it to various types of character patterns. There is a method thereamong of converting a character pattern vertically to laterally and vice versa, or of converting it italics by making use of softwares. This method however requires many processing and hence necessitates large-scale programs and a lot of time to be taken for those processings.

Hereupon, to speed up such processings, a method has been proposed, as disclosed in Japanese Laid-open Patent Publications No. 55-10647 and 57-136687, wherein vertrical and lateral conversions and conversion to italics are processed respectively with exclusive circuits as hardware for improving processing speeds.

However, those prior methods are adapted to have an exclusive circuit for the vertical and lateral conversion and that for the conversion to italics separately, and hence they can not satisfy both requirements of assuring both functions, vertical/lateral conversion to italics as well as of effecting both processings at a high speed. To effect both conversions with use of the above-described prior techniques, it is also possible to combine such two separate exclusive circuit, which however brings about circuits made large scale and costly.

SUMMARY OF THE INVENTION

In view of the drawbacks of the prior techniques, it is an object of the present invention to provide a character pattern converting circuit having each conversion function of vertical/lateral conversion and conversion to italics, and being capable of effecting those functions at a high speed inexpensively with simple hardware.

To achieve the above object, a character patterns converting circuit of the present invention is adapted to convert a character pattern expressed by in the form of a dot matrix and received from a character generator, and deliver the character pattern so converted.

The character pattern converting circuit includes a first switching circuit, a matrix circuit, a second switching circuit, and a matrix control part.

The first switching circuit serves to switch the order of bits constituting a character pattern issued from a character generator in conformity with the mode of the concerning conversion (vertical/lateral conversion and conversion to italics).

The matrix circuit includes shift registers arranged in the for of a matrix, each shift register serving to simultaneously or selectively shift each bit in accordance with the mode of the concerning conversion when permitting a character patterns from the first switching circuit to be entered thereinto in succession from the row or column direction of the matrix.

The second switching circuit serves to switch the order of bits constituting a character pattern delivered from the matrix circuit in accordance with the mode of the concerning conversion.

The matrix control part controls writing of a character pattern into the matrix circuit via the first switching circuit as well as reading of a character pattern from the matrix circuit via the second switching circuit.

In what follows, vertical/lateral conversion of $+90°$ will first be described. Thereupon, the first and second switching circuits are respectively assumed to be without switching (i.e., an input character pattern is delivered as it is) and to be with switching (in this case, bit positions of the LSB and MSB of the input character pattern are symmetrically replaced in order with each other). First, the matrix circuit receives the first column of the character pattern ($8 \times 8$) in the column direction thereof from the character generator via the first switching circuit in conformity with an instruction from the matrix control part. In succession, the matrix circuit likewise receives the second to eighth columns in the column direction. Thereupon, any data received previously are shifted in the column direction in order. Then, the matrix circuit reads in the row direction and outputs the above-described data received in the column direction, shifted in the same direction in order, and stored, based upon the instruction from the matrix control part. The output data are switched in their bit order of the LSB and MSB by the second switching circuit. As a result, the first column from the character generator for example is positioned at the eighth column after the conversion. Hereby, the vertical/lateral conversion of $+90°$ is accomplished.

In addition, when a character pattern is inclined in the right direction for example, the first and second switching circuits are set to be without switching. First, the matrix circuit receives a character pattern in the row direction thereof for each column delivered from the character generator in conformity with an instruction from the matrix control part, shifts that pattern in the column direction, and stores it in order. In succession, the matrix circuit selectively shift in the row direction the above-described data received in the row direction, shifted in the column direction, and stored, and delivers that data so shifted. For example, only particular two shift registers among shift registers of the matrix circuit are enabled in their shift operation at a certain instant of read clock, while the remaining shift registers are inhibited in their shift operation. In such a manner, a shift register to be shifted in its contents at each instant of read clock is specified and those contents are read. Such a read signal is delivered as it is via the second switching circuit. As a result, the character pattern so converted is inclined in the right direction (converted to italics inclined in the right direction)

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 4(a)-4(e) are views exemplarily illustrating the conversion of a character pattern according to the present embodiment of FIG. 1;

DESCRIPTION OF THE PREFERRED EMBODIMENT

In what follows, an embodiment of a character pattern converting circuit according to the present invention will be described with reference to the accompanying drawings.

Figure 1:
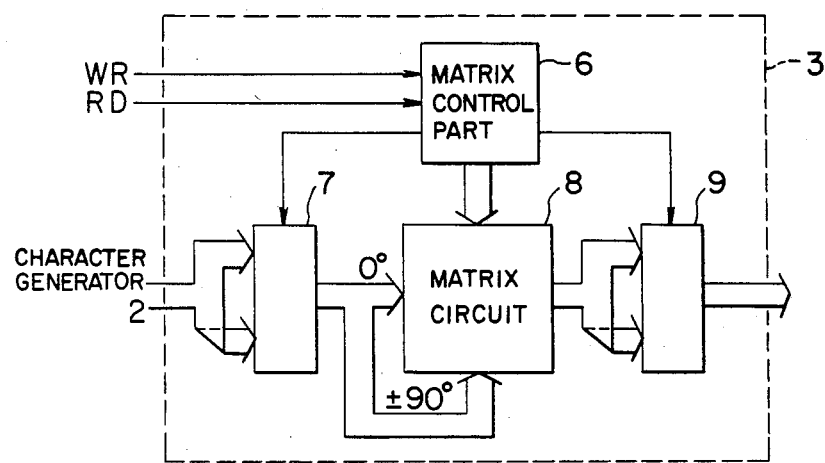
FIG. 1 is a circuit block diagram illustrating an embodiment of a character pattern converting circuit according to the present invention.
Figure 2:
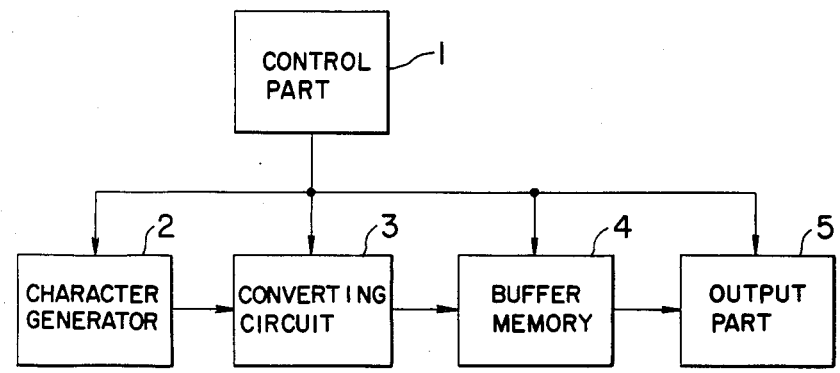
FIG. 2 is a block diagram illustrating a character output device with use of the embodiment of FIG. 1.

FIG. 1 is a block diagram illustrating an embodiment of a character pattern converting circuit according to the present invention, and FIG. 2 is a block diagram exemplarily illustrating a character output device constructed with use of the character pattern converting circuit.

First, as illustrated in FIG. 2, the control part 1 consists of a microcomputer for example and controls respective illustrated portions of the present circuit. The character generator 2 stores therein many character patterns in dot matrices, and issues character pattern data (character data) instructed by the control part 1. The character pattern converting circuit 3 (hereinafter simply referred to as a converting circuit) incorporates thereinto character data from the character generator 2 on the basis of the instruction from the control part 1 to effect vertical/lateral conversion or inclination conversion, and delivers character data converted as such. The buffer memory 4 stores those converted character data in proper areas thereof instructed by the control part 1. The output part 5, a printing part of a printer for example, prints character data taken out from the buffer memory 4 on the basis of an instruction from the control part 1.

The converting circuit 3 is constructed as illustrated in FIG. 1. As shown in the same figure, the matrix control part 6 consists of a counter, a register, and gates, and serves to count a write signal (hereinafter, referred to as a WR signal) issued from the control part 1 for writing character data in the matrix circuit 8 while serving to count a read signal (hereinafter referred to as an RD signal) issued from the control part 1 for reading character data converted in the matrix circuit 8 therefrom. In addition, the matrix control part 6 includes a rigister for setting the presence of switching between LSB/MSB switching circuits 7 and 9 serving to symmetrically switch the order of the LSB and MSB of data bits of the concerning character data, and for setting the presence of inclination of the vertical/lateral conversion in the matrix circuit 8. This register is set by the control part 1. The switching circuits 7 and 9 are respectively located at input and output parts of the matrix circuit 8 for symmetrically inverting the order of the LSB and MSB of data bits of the concerning character data entered in accordance with an instruction from the matrix control part 6 and delivering it, or for delivering that concerning character data as it is without inverting it.

Figure 3:
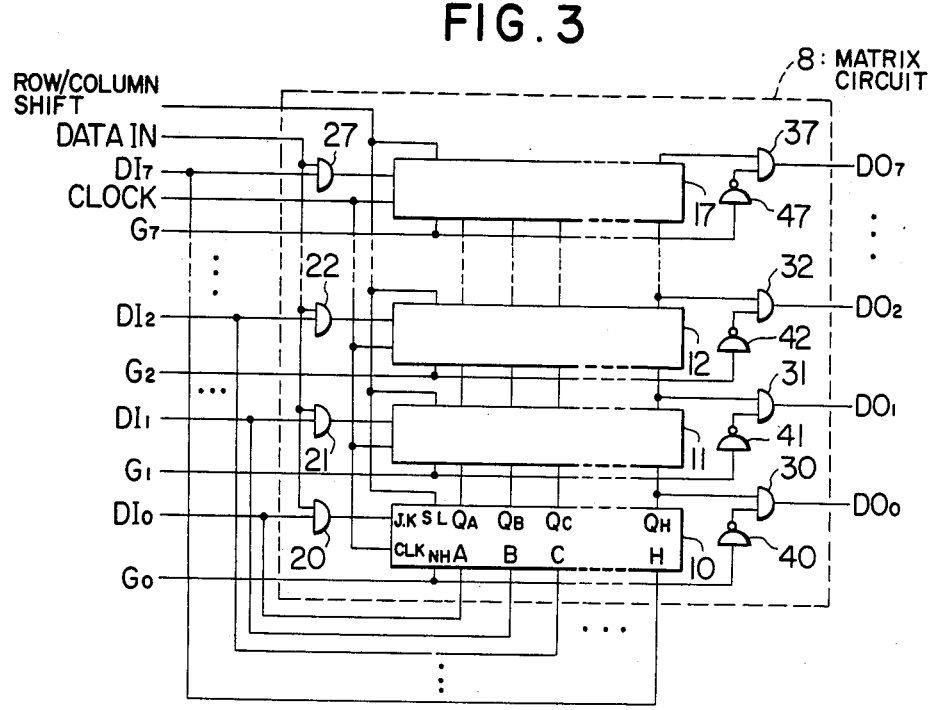
FIG. 3 is a circuit block diagram of a matrix circuit for use in the embodiment of FIG. 1.

The matrix circuit 8 has circuit configuration illustrated for example in FIG. 3. This circuit configuration is exemplarily provided for a character pattern of 8 row by 8 column. 8 bits shift registers 10 to 17 (corresponding to SN 74199 available from Texas Instrument Inc.) have eight-stage configuration in which parallel outputs QA to QH respectively take accesses in order to the next stage parallel inputs A to H, whereby they form registers of 8 by 8 matrix arrangement which are capable of shifting their contents in the row direction (right direction in FIG. 3) and in the column direction thereof (upper direction in the same figure). Timing control and switching control between row and column shifts of these registers are respectively effected by a clock signal and a row/column shift signal from the matrix control part 6. The concerning character data are entered into those shift registers 10 to 17 in two ways, in the row and column directions: outputs at DI0 to DI7 of the LSB/MSB switching circuit 7 are entered into parallel inputs A to H of the shift register 10 when they are to be entered in the column direction, while they are entered into serial inputs J, $\overline{K}$ of the shift registers 10 to 17 via the AND gates 20 to 27 when they are to be entered in the row direction. Moreover, when the concerning character data is converted and delivered from the shift registers 10 to 17, which is the row shift, G0 to G7 controlled by the matrix control part 6 control the enabling/inhibition of the shift operations of the shift registers 10 to 17, which G0 to G7 are respectively connected to the AND gates 30 to 37 via inverters 40 to 47 and control outputs delivered from the outputs QH of the shift registers 10 to 17. Outputs at DO0 to DO7 of the AND gates 30 to 37 are delivered to the LSB/MSB switching circuit 9.

In succession, operation of the present embodiment will be described.

Figure 5:
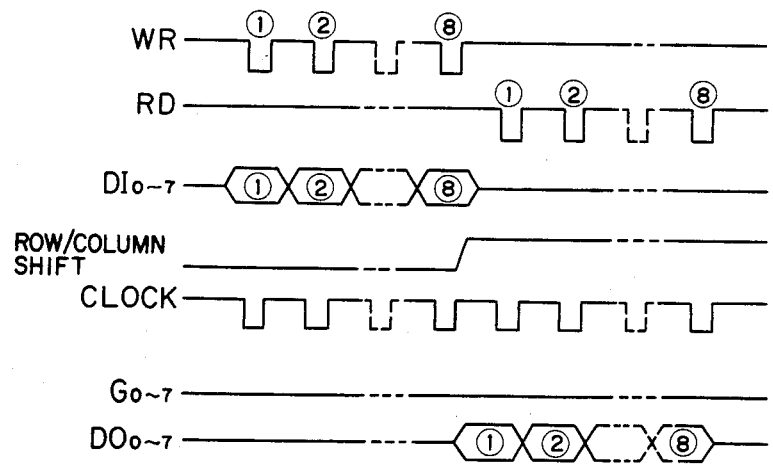
FIG. 5 is a time chart illustrating the operation of the matrix circuit when effecting vertical/lateral conversion in conformity with the embodiment of FIG. 1.

First, the vertical/lateral conversion will be described, in which a character pattern in FIG. 4 (a) is rotated by +90° as shown in the same figure (b). As illustrated in FIGS. 1 to 3, the control part 1 sets, for the vertical/lateral conversion by +90°, the registers in the matrix control part 6, and issues a row/column shift signal which requires for an input of the concerning character data into the shift registers 10 to 17 to be arranged in the column direction. In addition, the control part 1 thereupon sets the LSB/MSB switching circuits 7 and 9 respectively to states without and with switching. Then, the control part 1 takes out first column data Da1 to Dh1 (ath row, first column data is assumed to be Da1) of a character pattern, shown in FIG. 4 (a) for example, in the character generator 2, and writes them into the converting circuit 3. The matrix control part 6 receives a WR signal from the control part 1 to issue a clock pulse to the shift registers 10 to 17 as shown in the time chart of FIG. 5, whereby the above-described data Da1 to Dh1 passing without switching through the LSB/MSB switching circuit 7 are respectively stored in the shift register 10 through the inputs H to A thereof. Second column data Da2 to Dh2 of the character pattern are also rendered to the same processing, and they are respectively stored in the shift register 10 through the inputs H to A thereof while the data Da1 to Dh1 are shifted to the shift register 11, on the basis of the second clock pulse shown in FIG. 5. The character patterns are successively entered up to the eight column data Da8 to Dh8 by the same processing, whereby the character data are shifted in order in the column direction through the shift registers 10 to 17 and stored therein. The matrix control part 6, after counting the WR signal to 8 pulses, switches the row-/column signal from the column shift to the row shift as shown in FIG. 5. In succession, the matrix control part 6 issues a clock pulse to the shift registers 10 to 17 on the basis of the RD signal from the control part 1. Based upon this timing, data in the shift registers 10 to 17 are shifted in the row direction, whereby Da1 to Da8 are delivered from the respective QH outputs of the shift registers 10 to 17 via AND gates 30 to 37. These data Da1 to Da8 are switched in their bit order of the LSB and MSB through the LSB/MSB switching circuit 9, delivered, and stored in the buffer memory 4 under the control of the control part 1. These are first column data shown in FIG. 4 (b). In succession, with the same processing effected on the basis of the next RD signal, the contents of the shift registers 10 to 17 are further shifted in the row direction, whereby Db1 to Db8 are delivered respectively to the outputs of the AND gates 30 to 37, and after being switched by the LSB/MSB switching circuit 9, stored in the buffer memory 4. In such a manner, the character data in the shift registers 10 to 17 are shifted in order in the row direction and delivered owing to pulses of the RD signal 8, and after being switched by the LSB/MSB switching circuit 9, stored in the buffer memory 4 as shown in FIG. 4 (b).

As described above, any character data is written into the shift registers 10 to 17 in the column direction and read from the row direction thereof, and thereafter switched in their order of the LSB and MSB, whereby the character pattern shown in FIG. 4 (a) is rendered to +90° vertical/lateral conversion as shown in the same figure (b). The control part 1 transmits the contents of the buffer memory 4 to the output part 5.

Moreover, when the character pattern as illustrated in FIG. 4 (a) is rendered to −90° rotation vertical/lateral conversion as shown in the same figure (c), with the LSB/MSB switching circuits 7 and 9 being set respectively to states with switching and without switching, quite the same processing as in +90° may be effected.

Figure 6:
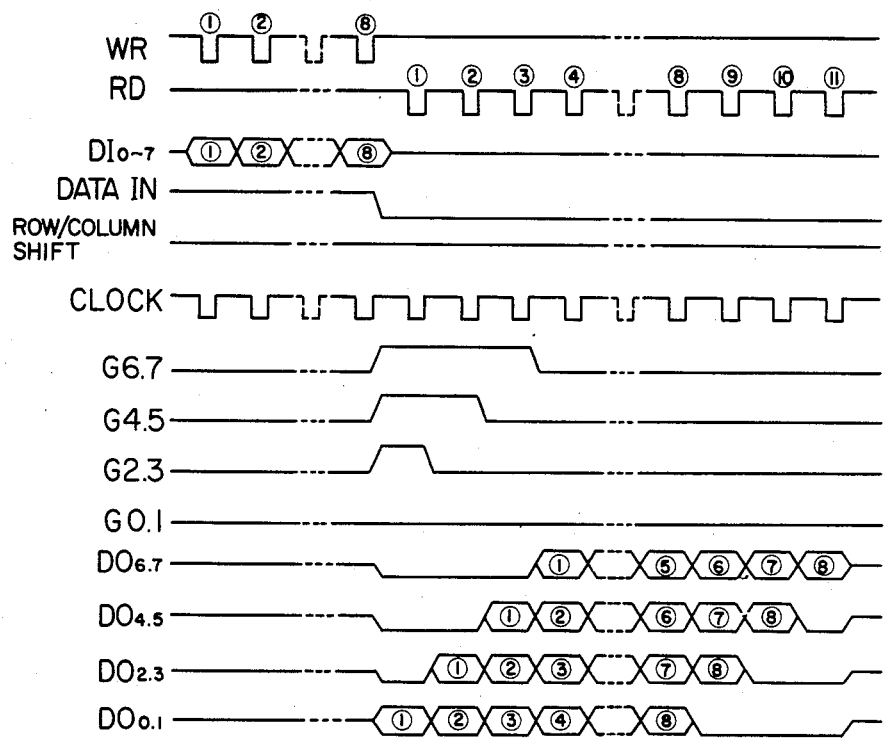
FIG. 6 is a time chart of the matrix circuit when inclining a character pattern (converting it to italics) in conformity with the embodiment of FIG. 1.

Successively, inclination processing (conversion to Italics), a case for example of converting the character pattern of FIG. 4 (a) to that of the same figure (d) will be described. First, in the same manner as described above, the control part 1 sets, for effecting the inclination processing, the registers in the matrix control part 6, and sets the concerning character data such that they are entered into the shift registers 10 to 17 in the row direction, and furthermore sets both the LSB/MSB switching circuits 7 and 9 to their states without switching. In succession, the control part 1 writes the first column data Da1 to Dh1 of the character pattern of FIG. 4 (a) into the converting circuit 3 as described previously. The matrix control part 6 receives that WR signal to issue a clock pulse to the shift registers 10 to 17 as illustrated in the time chart of FIG. 6, whereby the data Da1 to Dh1 are entered into the shift registers 17 to 10 through the J and $\overline{K}$ inputs thereof via the LSB/MSB switching circuit 7 and the AND gates 20 to 27 and respectively stored therein. With the character pattern rendered in succession to the same processing in such a manner up to the eight column data Da8 to Dh8 thereof, the character data are shifted in order through the shift registers 10 to 17 and stored therein, and finally all the data of the character pattern are stored therein. The matrix control part 6, after counting the WR signal by eight pulses, switches a DATA IN signal as illustrated in FIG. 6 to set all outputs of the AND gates 20 to 27 to "L". In succession, the matrix control part 6 issues a clock pulse to the shift registers 10 to 17 on the basis of the RD signal from the control part 1, while at the same time the shift registers 12 to 17 are inhibited in their operation owing to G2 to 7 and only the shift registers 10, 11 are shifted as shown in FIG. 6.

Simultaneously, those signals on G2 to 7 are entered into the AND gates 32 to 37 via the inverters 42 to 47, whereby "L" is provided to DO2 to DO7 while the data Dh1 and Dg1 of FIG. 4 (a) are provided only to DO0 and DO1. Those latter data are delivered via the LSB/MSB switching circuit 9 and stored in the buffer memory 4 with the aid of the control part 1.

These stored data are first column data shown in FIG. 4 (d). In succession, the same processing is effected by the second RD signal, and since the shift registers 14 to 17 are inhibited in their shift operation by G4 to 7, contents of only the shift registers 10 to 13 are shifted. Therefore, only DO0 to DO3 respectively provide outputs Dh2, Dg2, Df1, and De1, and the remaining Do4 to Do7 provide "L". In the same manner, with the third RD signal, since the shift registers 16 and 17 are inhibited in their shift operation owing to G6 and 7, DO0 to DO5 respectively provide Dh3, Dg3, Df2, De2, Dd1, and Dc1, and the remaining DO6 and DO7 provide "L". With the fourth shift RD signal, all inhibitions of the concerning shift operation due to G0 to G7 are released, and all the shift registers, while keeping the contents thereof shifted in order, are shifted in the row direction at each clock pulse. Since the DATA IN signal is "L" when the RD signal is issued, all the outputs of the AND gates 20 to 27 also become "L", and hence "L" is entered in order in the shift registers which are empty as a result of those shift registers being shifted, whereby the shift register which delivers all 8 bit data provides "L" by a clock pulse thereafter.

Effecting in such a manner the same processing based on FIG. 6, the character pattern of FIG. 4 (a) is converted as shown in the same figure (d) with eleven times of the RD signal. As described above, each row shift operation of the shift registers is inhibited in order by the signals on the terminals G0 to G7, whereby character data to be delivered are shifted in order to enable the character to be inclined.

Although the above description was for a case of the character pattern inclined to the right as shown in FIG. 4 (d), for a case thereof inclined to the left the same processing may be conducted while setting both the LSB/MSB switching circuits 7 and 9 to a state thereof with switching, or timings on the G0 to G7 may be reversed in their order.

In addition, although the above description was for a case of the character pattern wherein it is shifted for its inclination two bits at a time from the lower rank of the bits as shown in FIG. 4 (d), provided the timing of releasing the inhibition of the shift operations of G0 to G7 in FIG. 6 is shifted in order one at a time at each RD signal, inclination for each bit is also assured. Provided the degree of such timing of shifting G0 to G7 is arbitrarily changed, the degree and fineness of inclination of a character pattern can be controlled.

Moreover, a combination of the vertical/lateral conversion and the processing of inclination described above for converting any character pattern to that as illustrated in FIG. 4 (e) is also possible. In this case, when any character is entered into the shift registers 10 to 17, it may be effected with column shift as in the vertical/lateral conversion, and when the character data is delivered, the respective shift registers may be inhibited in their shift operation by G0 to G7 and delivered while permitting the contents thereof to be shifted in order, in the same manner as in the inclination processing. In case of FIG. 4 (a), the LSB/MSB switching circuits 7 and 9 are previously set respectively to their states without switching and with switching.

Furthermore, although in the above description a character pattern of 8 rows by 8 columns was disclosed, another character patterns of arbitrary sizes may also be possible.

According to the present invention, as described above, the character pattern converting circuit is adapted to include a matrix circuit having shift registers arranged in the form of a matrix which processes a character pattern issued from the character generator to enter in order thereinto the character pattern in the row or column direction and deliver it in the row direction, and to thereupon shift respective bits constituting the character pattern simultaneously or successively; the LSB/MSB switching circuits positioned at input and output portions of the matrix circuit for switching the order of the LSB and MSB of the respective bits; and a matrix control part for controlling the write and read of the character pattern into and from the matrix circuit. Accordingly, the character pattern converting circuit can process at a high speed the vertical/lateral conversion of +90° and −90° rotations, and right and left inclination processings.

Although a certain preferred embodiments have been shown and described, it should be understood that many changes and modifications may be made therein without departing from the scope of the appended claims.

What is claimed is:

1. A character pattern converting circuit for converting a character pattern received from a character generator and expressed in the form of a dot matrix, and for delivering said converted character pattern, said character pattern converting circuit comprising:

(a) a first switching circuit for switching the order of bits constituting the character pattern issued from said character generator in conformity with a mode of conversion;

(b) a matrix circuit connected to said first switching circuit and including shift registers arranged in the form of a matrix, said shift registers being adapted to shift, upon permitting the character pattern from said first switching circuit to be entered in succession in the row or column direction thereof and delivered in the row direction, respectively bits constituting the character pattern simultaneously or selectively in conformity with said mode of conversion;

(c) a second switching circuit connected to said matrix circuit for switching the order of the bits constituting the character pattern provided from said matrix circuit in conformity with said mode of conversion; and (d) a matrix control part connected to said first and second switching circuits and said matrix circuit for selecting said mode of conversion and for controlling writing of the character pattern into said matrix circuit via said first switching circuit and for controlling reading of the character pattern from said matrix circuit via said second switching circuit.

2. A character pattern converting circuit according to claim 1, wherein said first and second switching circuits are LSB/MSB switching circuits for symmetrically switching the order of the LSB and MSB of data bits constituting said character pattern, and for setting the presence of inclination in addition to the vertical/lateral conversion into said matrix circuit.

3. A character pattern converting circuit according to claim 1, wherein said matrix circuit includes AND gates, and inverters, said shift registers being in an 8 by 8 matrix arrangement adapted to have parallel outputs of each stage thereof adjoining to parallel inputs of the next stage thereof, the contents of said shift registers in said matrix arrangement being shiftable in the row and column directions of said matrix arrangement.

* * * * *